United States Patent
Niwa et al.

(10) Patent No.: US 6,398,242 B1
(45) Date of Patent: *Jun. 4, 2002

(54) INSTALLATION POSITION OF A DAMPER FOR INDUSTRIAL VEHICLES

(75) Inventors: Yasuhiro Niwa; Shuji Ohta; Kazuya Ogawa, all of Kariya (JP)

(73) Assignee: Kabushiki Kaisha Toyoda Jidoshokki Seisakusho, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,554

(22) Filed: Jun. 16, 1999

(30) Foreign Application Priority Data

Jun. 17, 1998 (JP) .................................. 10-170268

(51) Int. Cl.⁷ .................................................. B60G 1/99
(52) U.S. Cl. .............................. 280/124.11; 280/124.111
(58) Field of Search ..................... 280/124.11, 124.111, 280/124.109, 124.157

(56) References Cited

U.S. PATENT DOCUMENTS

| | | | |
|---|---|---|---|
| 4,393,959 A | | 7/1983 | Acker .............................. 187/9 |
| 4,570,971 A | * | 2/1986 | Perlini ................... 280/124.112 |
| 4,750,751 A | | 6/1988 | Schafer ........................ 280/6 H |
| 5,362,091 A | * | 11/1994 | Lee ....................... 280/124.112 |
| 5,879,016 A | * | 3/1999 | Altherr et al. ........ 280/124.112 |
| 5,947,516 A | * | 9/1999 | Ishikawa ..................... 280/755 |

FOREIGN PATENT DOCUMENTS

| | | | | |
|---|---|---|---|---|
| EP | 0 796 749 | 9/1997 | ............ | B60G/9/02 |
| FR | 1 514 879 | 5/1968 | | |
| GB | 1 329 805 | 9/1973 | .......... | D62D/21/02 |
| JP | 40-243 | 1/1965 | | |
| JP | 49-77619 | 7/1974 | | |
| JP | 54-65118 | 5/1979 | | |
| JP | 57-71196 | 4/1982 | | |
| JP | 58-211903 | 12/1983 | | |
| JP | 09-309308 | 12/1997 | | |
| JP | 09-309309 | 12/1997 | | |

* cited by examiner

Primary Examiner—Eric Culbreth
Assistant Examiner—L. Lum
(74) Attorney, Agent, or Firm—Morgan & Finnegan, LLP

(57) ABSTRACT

A forklift has a frame and a rear axle, which is pivotally joined to the frame about a center pivot axis. Front and rear supporting members support the frame on the axle. A damper is located between the frame and the axle. The damper has an upper end connected to the frame and a lower end connected to the axle. A bracket for joining the upper end of the damper to the frame is located no further forward than the front end of the front support member and no further rearward than the rear support member. This structure suppresses torsion and bending force applied to the damper.

21 Claims, 7 Drawing Sheets

INSTALLATION POSITION OF A DAMPER FOR INDUSTRIAL VEHICLES

BACKGROUND OF THE INVENTION

The present invention relates to an installation position of a damper in industrial vehicles such as forklifts.

Generally, in forklifts, a rear axle supporting rear wheels is pivotally attached to a vehicle frame by a center pin. A damper, which is a hydraulic cylinder, is located between the vehicle frame and the rear axle. When the vehicle travels on a bumpy surface, the damper extends and contracts to permit a pivotal movement of the rear axle. This suppresses inclination of the vehicle and improves the stability of the vehicle.

When the vehicle turns, the vehicle may be excessively inclined by a centrifugal force applied on the vehicle body. As a measure against this, Japanese Unexamined Patent Publications NOS. 9-309308, 9-309309 describe a technology for locking the damper based on detection of the vehicle's turning state to limit the pivotal movement of the rear axle.

The vehicle frame has a box-structure for strength. However, to produce a space for accommodating the rear axle and the rear wheels, the sectional area of the vehicle frame is smaller toward its rear. Thus, the strength of the vehicle frame is relatively weak in the vicinity of the rear axle. Further, a force is applied to a part of the frame at which the upper end of the damper is attached. When the damper is locked, a much greater force is applied to the part.

To receive the force of the damper, the upper end of the damper should be attached to a stronger part of the frame, that is, the front part where the sectional area is greater. As one option, a bracket may be extended from the rear axle to the front part of the vehicle frame, and the lower portion of the damper may be supported by the bracket. In this way, the damper is located toward the front part of the frame, and the upper portion of the damper can be attached to a forward part of the frame. As a second option, the axis of the damper may be inclined to extend from the rear axle toward the front part of the frame. In this case the lower portion of the damper is supported on the rear axle, and the upper portion of the damper is attached to a forward part of the frame.

However, in the first option, a load may be applied from the frame to the bracket, and the bracket may be deformed by the force. This may apply a bending force to the damper, thus disturbing the operation of the damper. Therefore, the bracket must be strong, which increases the size of the bracket. Also, since the bracket projects frontward from the rear axle, the rear wheels may interfere with the damper or the bracket when the rear wheels are turned to the maximum angle. This limits the range of steering of the rear wheels.

In the second option, the axis of the damper crosses a plane perpendicular to the pivoting axis of the rear axle. Therefore, when the rear axle pivots, a torsion force and a bending force are applied to the damper. The torsion force applies a deforming force to the connecting parts between the damper, the rear axle, and vehicle frame. The bending force disturbs the optimal operation of the damper. Therefore, the damper must be strong to withstand the torsion and bending forces, which increases the size of the damper.

SUMMARY OF THE INVENTION

An objective of the present invention is to provide a structure for desirably arranging a damper between a rear axle and a vehicle frame.

To achieve the above objective, the present invention provides an industrial vehicle having the following structure. A frame includes a forward end and a rearward end. A rear axle is pivotally joined to the frame about a pivot axis. A pair of supporting members support the frame on the axle. The supporting members are intersected by a vertical plane that includes the pivot axis. A damper is located between the frame and the axle. The damper has a longitudinal axis. An upper end of the damper is connected to the frame and a lower end of the damper is connected to the axle. A bracket is located on the frame to receive the upper end of the damper. The bracket is located no further forward than the front supporting member and no further rearward than the rear supporting member.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
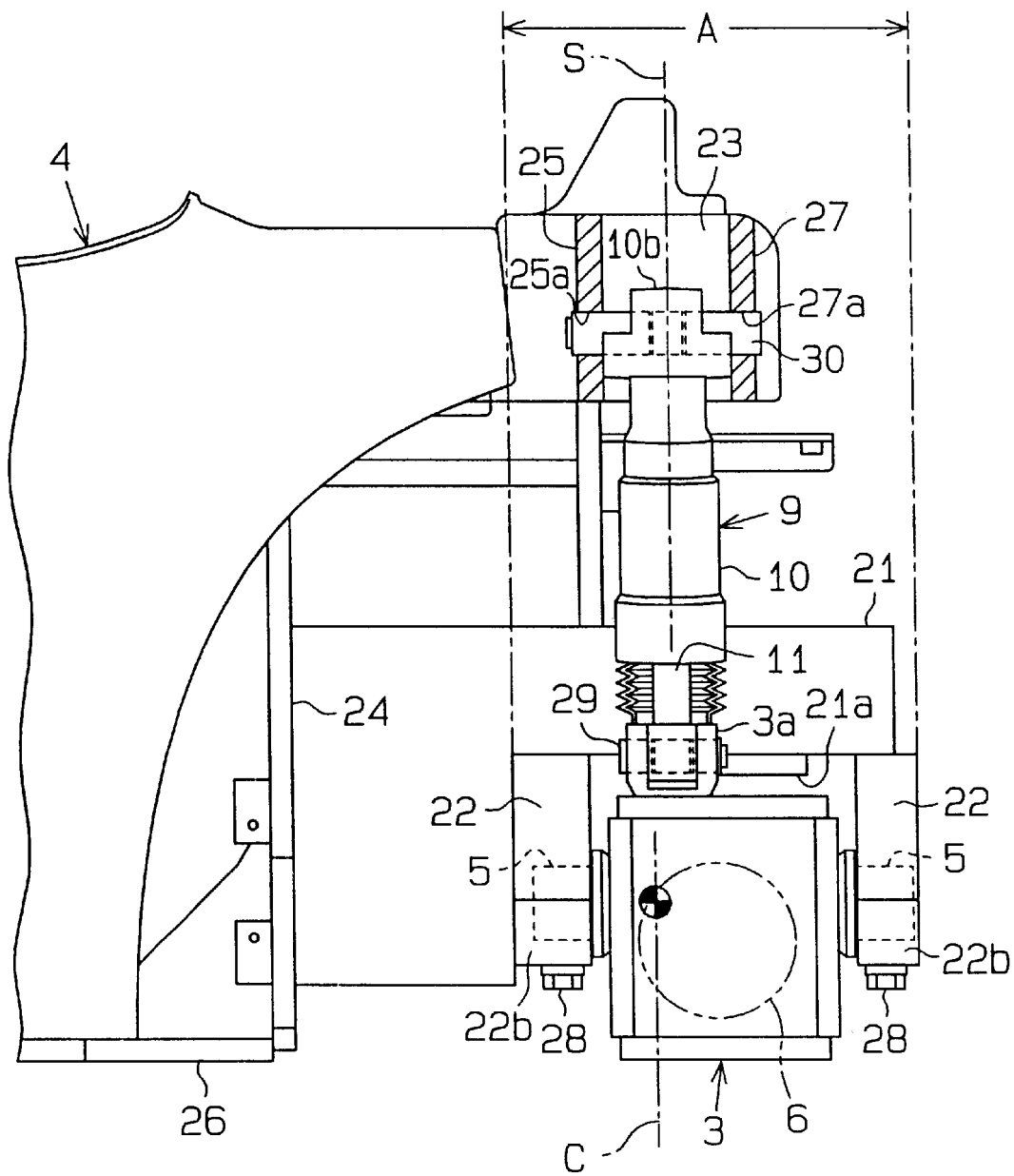
FIG. 1 is a partial enlarged side view showing a structure for arranging a damper in a first embodiment of the present invention.
Figure 6:
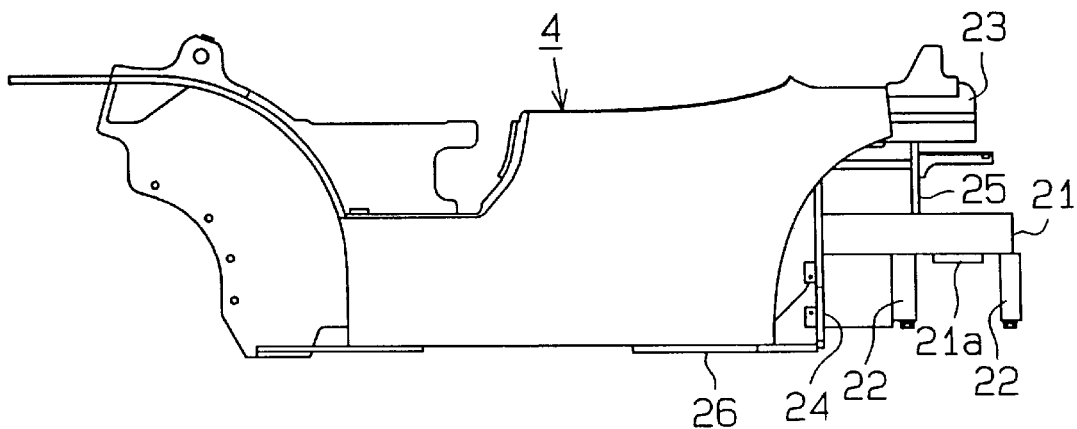
FIG. 6 is a side view of the vehicle frame of FIG. 5.
Figure 7:
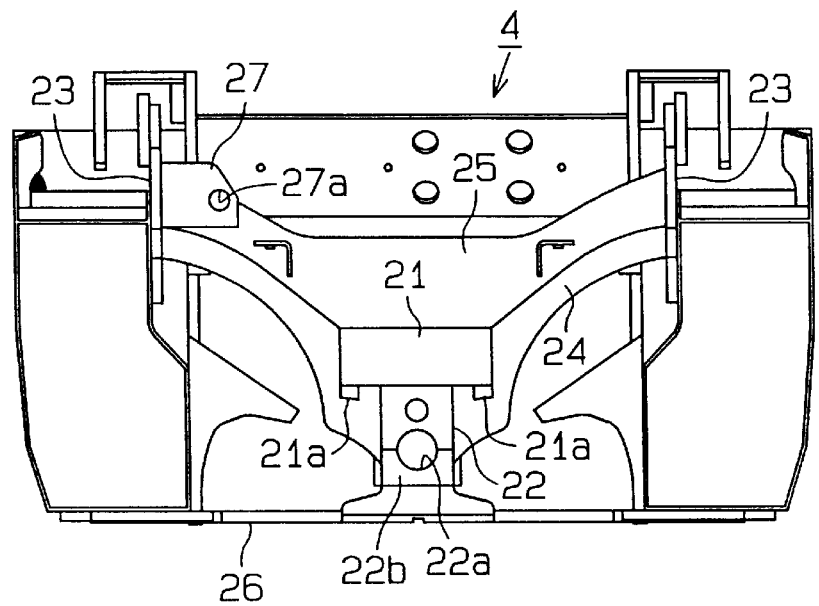
FIG. 7 is a rear view of the vehicle frame of FIG. 5.
Figure 8:
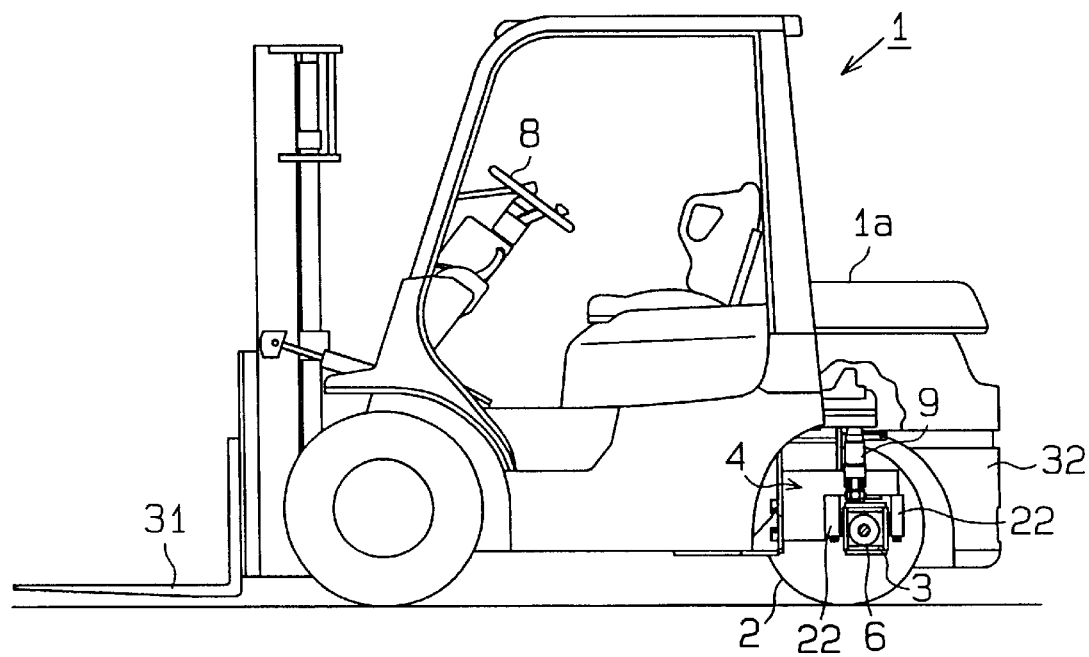
FIG. 8 is a side view of the forklift of FIG. 3.

A forklift according to a first embodiment of the present invention will now be described with reference to FIGS. 1–8. As shown in FIG. 8, a forklift 1 includes a rear axle 3, which supports a pair of steered rear wheels 2 (only one shown). As shown in FIG. 1, a pair of center pins 5 extend from the front and rear surfaces of the rear axle 3. As shown in FIGS. 1 and 3, the rear axle 3 is pivotally supported about the center pins 5 by the frame 4 of a vehicle body 1a. The rear axle 3 pivots in a plane perpendicular to the axis of the center pins, or perpendicular to the longitudinal axis of the vehicle body 1a.

The rear axle 3 is framed in a generally rectangular shape. A steering cylinder 6 is accommodated in the rear axle 3.

The steering cylinder 6 includes a pair of piston rods 6a. The rear wheels 2 are supported at both ends of the rear axle 3 through the kingpins 7, which permit the wheels to be steered. Each piston rod 6a is connected to a corresponding one of the kingpins 7 through a link mechanism (not shown). The steering cylinder 6 is driven by the operation of a steering wheel 8 shown in FIG. 8, thus turning the rear wheels 2.

As shown in FIGS. 3 and 8, a damper 9 is located between the frame 4 and the rear axle 3. The damper 9 is a double-action type hydraulic cylinder. A block 10a is integrally formed on side of a cylinder tube 10 of the damper 9. The block 10a includes a hydraulic circuit for controlling the movement of the damper 9.

Figure 4:
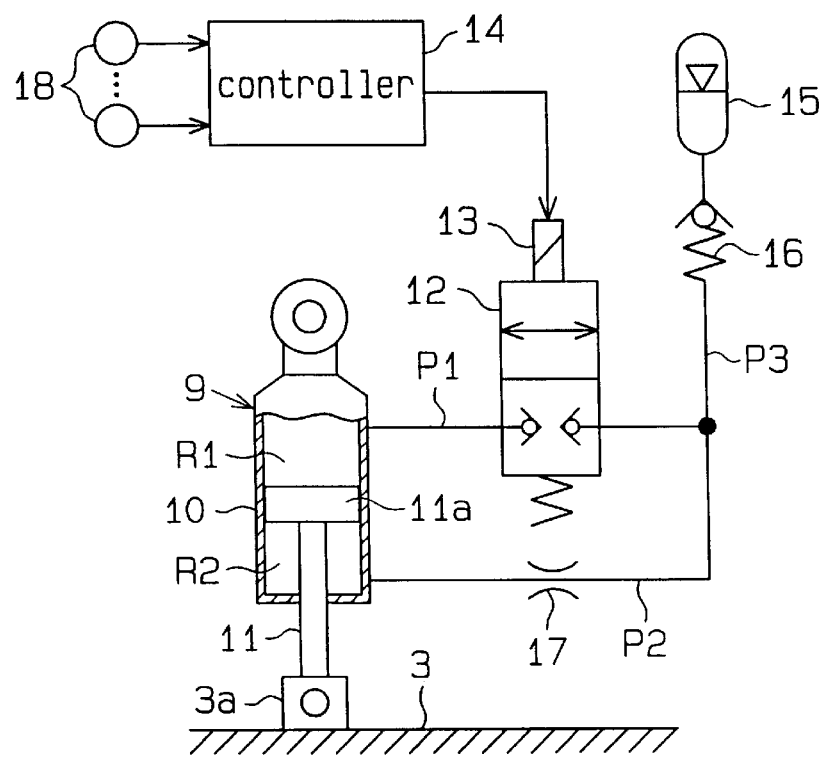
FIG. 4 is a diagrammatic view showing a hydraulic circuit in the forklift of FIG. 3.

FIG. 4 is a diagram showing a hydraulic circuit. Two oil chambers R1, R2 are defined in the cylinder tube 10 by a piston 11a. A passage P1 connects the chamber R1 to an electromagnetic valve 12. A passage P2 connects the chamber R2 to the valve 12. The valve 12 is a two-position shift valve. A controller 14 opens and closes the valve 12 by selectively exciting or demagnetizing a solenoid 13 of the valve 12. When the valve 12 is closed, the passages P1, P2 are separated, and the circulation of hydraulic oil between the chambers R1, R2 is prevented. Therefore, the piston 11a of the damper 9 is fixed, thus locking the rear axle 3. On the other hand, when the valve 12 is opened, the passages P1, P2 are connected, and the circulation of hydraulic oil is permitted between the chambers R1, R2. Therefore, the piston 11a of the damper 9 can move, thus allowing the rear axle 3 to pivot.

An accumulator 15 is connected to the passage P2 through the passage P3. When the hydraulic oil in the cylinder tube 10 decreases from leakage, a check valve 16 located in the passage P3 is opened and hydraulic oil is supplied from the accumulator 15 to the cylinder tube 10. A restriction valve 17 is located in the passage 2. The restriction valve 17 restricts the circulation of hydraulic oil between the oil chambers R1, R2.

Sensors 18, which are attached to each part of the forklift 1, are connected to the controller 14. The controller judges the operating state of the forklift based on the detection signals from the sensors 18. When the operating state of the forklift 9 fulfills predetermined conditions for locking, the controller 14 demagnetizes the solenoid 13 and closes the valve 12.

Figure 5:
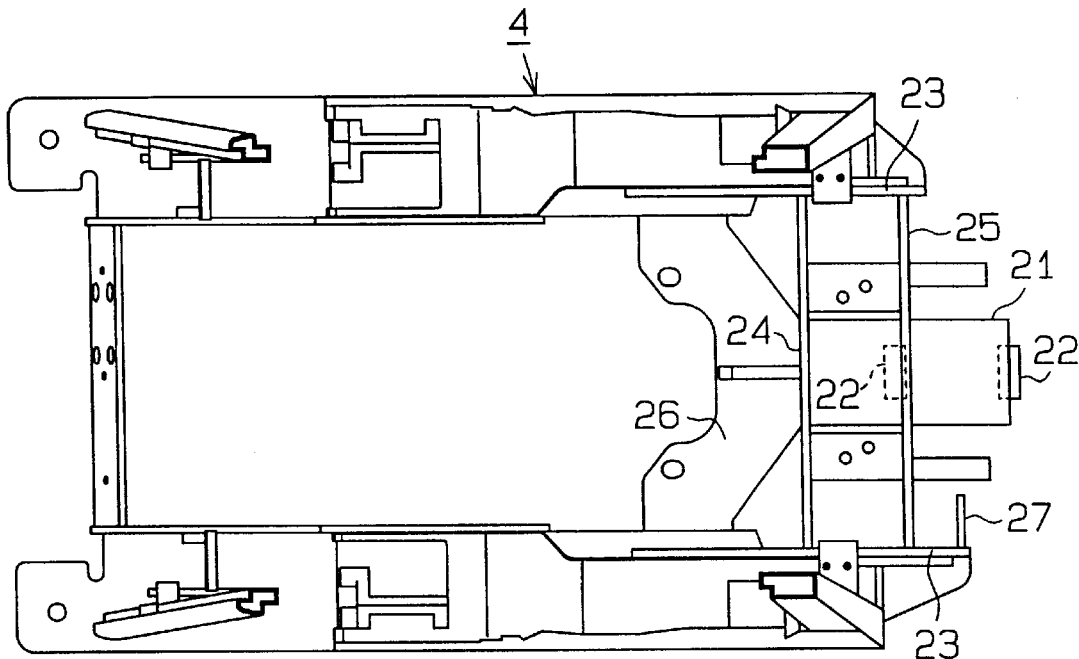
FIG. 5 is a plan view of a vehicle frame of the forklift of FIG. 3.

The structure of the frame 4 will now be described. As shown in FIGS. 5–7, the frame 4 has a box-structure. The rear of the frame 4 is curved to produce a space for the rear axle 3 and the rear wheels 2. A support 21 extends horizontally toward the rear. A pair of support members 22 extend downward from the lower surface of the support 21. The rear axle 3 is supported between the support members 22. A hole 22a for receiving the center pins 5 is formed on each of the facing surfaces of the support members 22 (See FIG. 2). Right and left stoppers 21a extend from the lower surface of the support 21. Abutment of the stoppers 21a against the rear axle 3 limits the pivotal movement of the rear axle 3.

As shown in FIGS. 5 and 7, a pair of side plates 23 are provided in the rear of the frame 4. Generally Y-shaped back plates 24, 25 are arranged between the side plates 23. The back plates 24, 25 extend across the longitudinal axis of the forklift 1 at right angles. The ends of the back plates 24, 25 are welded to the side plates 23. The middle portion of the front back plate 24 is welded to a bottom plate 26, which is located at the lower surface of the frame 4. The middle portion of the rear back plate 25 is welded to the support 21.

An attachment plate 27 extends inward from one side plate 23 (left side in FIG. 7). The attachment plate 27 is located behind and parallel to the back plate 25 and is welded to the side plate 23. The attachment plate 27 and the back plate 25 supports the upper end of the damper 9.

As shown in FIGS. 1 and 3, a lower portion 22b of each support member 22 is detachable, thus dividing the hole 22a into upper and lower parts. The center pin 5 is received in the hole 22a through a bushing B (See FIG. 3). When assembling the rear axle 3, the lower portions 22b are attached to the corresponding upper portions of the support members 22 by bolts 28. The rear axle 3 is supported by the pair of support members 22 at two points.

Figure 2:
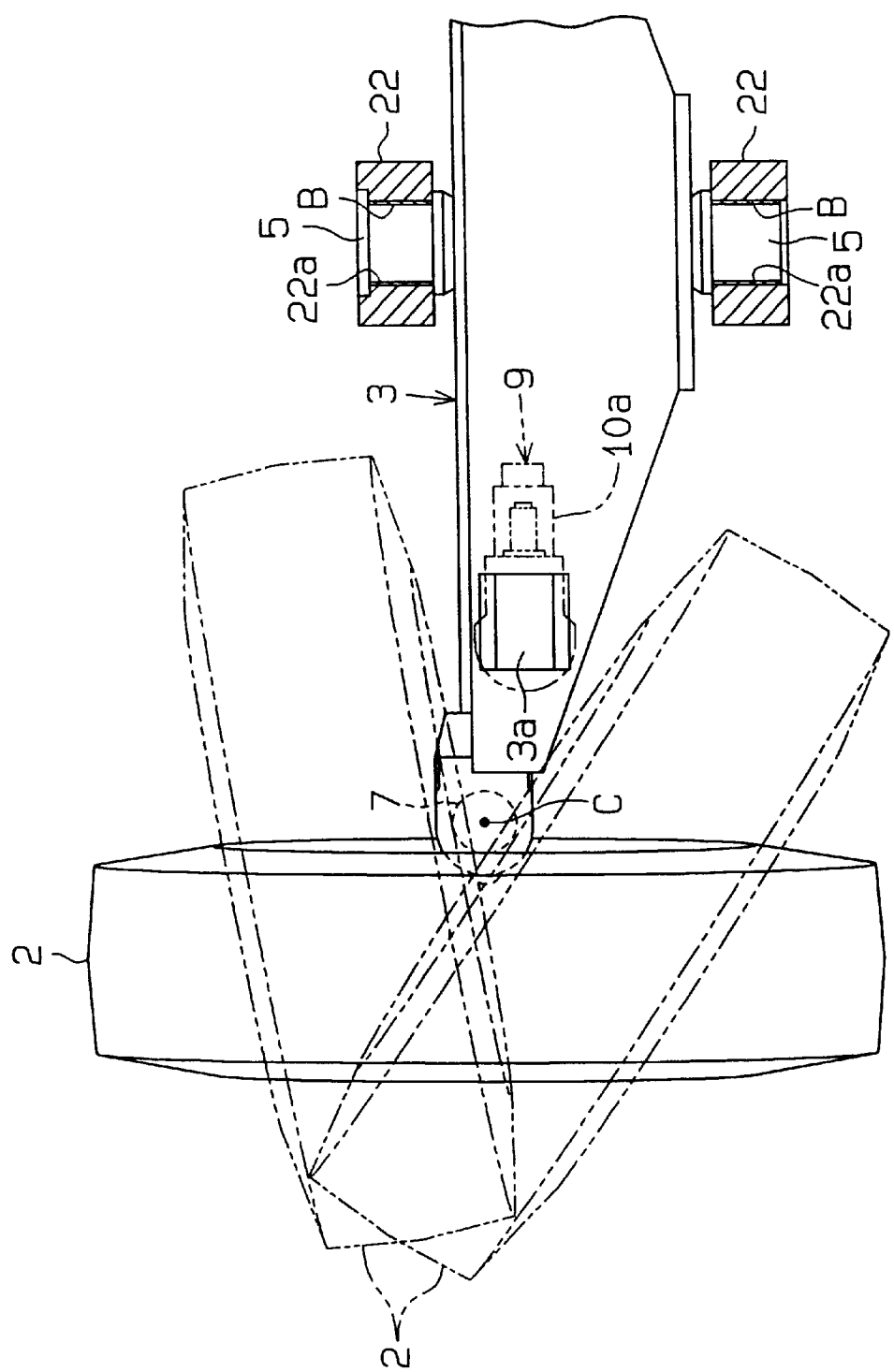
FIG. 2 is a partial enlarged top plan view of the rear axle of FIG. 1.
Figure 3:
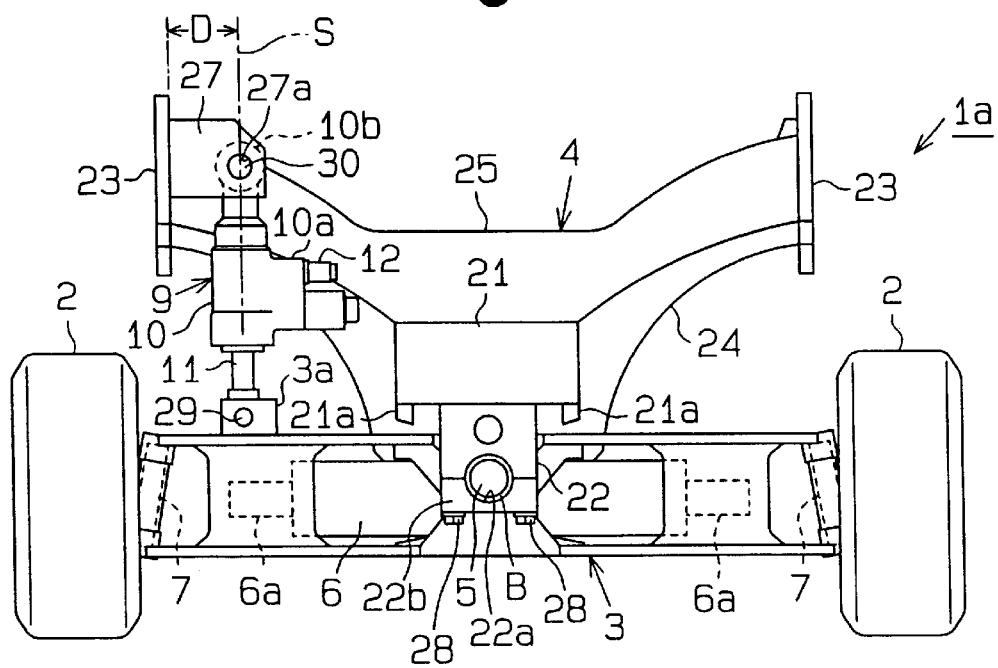
FIG. 3 is a rear view of a forklift having the damper of FIG. 1.

As shown in FIGS. 1, 2, and 3, a U-shaped lower bracket 3a is located on the upper surface of one end (left end in FIG. 3) of the rear axle 3. The distal end of a piston rod 11 of the damper 9 is supported by the lower bracket 3a through a pin 29. Similarly, the damper may be located between the frame 4 and the right end of the axle 3, which is opposite to the arrangement pictured in FIG. 3.

As shown in FIG. 1, the back plate 25 for supporting the upper end of the damper 9 and the attachment plate 27 are located in a range A between the outer end surfaces of the front and rear support members 22. That is, a bracket formed by the back plate 25 and the attachment plate 27 is located within a range A, and the range A is defined by two vertical planes that are perpendicular to the pivot axis of the center pin 5. One of the planes is located at the front end of the front support member 22, and the other plane is located at the rear end of the rear support member 22, as shown in FIG. 1, where the planes are represented by broken vertical lines. Therefore, it is possible to install the damper 9 such that the axis S of the damper 9 is parallel to or within a plane that includes the path along which a point on the rear axle 3 moves when the rear axle 3 pivots.

A pin 30 is inserted in a connecting portion 10b at the proximal end of the cylinder tube 10, and the damper 9 is supported by the back plate 25 and the attachment plate 27. The positions of the back plate 25 and the attachment plate 27 are determined such that the axis S of the damper 9 is substantially parallel to or in the pivoting plane of the rear axle 3.

As shown in FIG. 3, when the rear axle 3 is in a normal, unpivoted state and the vehicle is on a horizontal surface, the longitudinal axis S of the damper 9 is substantially perpendicular to the longitudinal axis of the rear axle 3. In other words, when the rear axle 3 is horizontal and the frame is not tilted, the longitudinal axis S of the damper 9 is parallel to a tangent of the arc formed by the path of movement of a point on the rear axle 3.

A block 10a of the damper 9 extends in the longitudinal direction of the rear axle 3 and projects toward the longitudinal center of the rear axle 3. Therefore, as shown in FIGS. 1 and 2, the damper 9 is located within the front-to-back dimension of the rear axle 3. In other words, the entire damper 9 is located above the axle 3, or within a vertical projection of the axle 3. In the present embodiment, the position of the lower bracket 3a is located as close as possible to the axis C of the steering center of the rear wheels 2 (the axis of the king pins 7) in the front-to-back direction of the forklift 1 (left-right direction in FIGS. 1 and 2). That is, without any part of the damper 9 extending beyond a vertical projection of the rear axle 3, the longitudinal axis S of the damper 9 in the front-to-back direction of the forklift 1 is located as close as possible to the plane in which steering axes C lie. As shown in FIG. 2, this prevents interference of the damper 9 with the rear wheels 2 when the rear wheels are steered to the maximum angle. In other words, the steering angle range of the rear wheels 2 is maximized.

As shown in FIG. 8, a fork 31 is provided in the front of the forklift 1. In the rear of the forklift 1, a balance weight 32 is provided to prevent the vehicle from being unbalanced by the weight of a load on the fork 31. The balance weight 32 is supported by the frame 4 through a coupler (not shown) such as a hook. Generally, the coupler is located in the range A (See FIG. 1) or in front of the range A. Since the force of the damper 9 is received by the frame 4 in the vicinity of the coupler, shock applied to the frame 4 is effectively reduced. To receive the pushing force from the damper 4 more effectively, the strength of the frame 4 is increased compared to the prior art by adding strengthening members and increasing the thickness of the plates.

As shown in FIG. 3, a distance D from the side plates 23 to the holes 25a, 27a is ten centimeters or less. That is, the upper end of the damper 9 is supported in the vicinity of the side plate 23. The lower end of the damper 9 is supported in the vicinity of the end of the rear axle 3. The distance from the center pin 5 to the attachment position of the lower end of the damper 9 is greater than half of the distance from the center pin 5 to the end of the rear axle 3. Since the distance D from the upper end of the damper to the side plate is within ten centimeters, or relatively small, the moment received by the side plate 23 due to the force from the damper 9 is minimized. Further, the distance D between the side plate 23 and the damper 9 is determined to avoid interference of the damper 9 with the side plate 23.

In this kind of forklift 1, when the rear axle 3 is pivoted, the damper 9 contracts and extends in a plane perpendicular to the axis of the center pin 5. That is, the damper 9 is always located in a pivoting plane of the rear axle 3. Accordingly, the torsion force applied to the damper 9 is reduced. This prevents excessive force from being applied to the upper and lower connecting portions of the damper 9. When the rear axle 3 is horizontal, the axis S of the damper 9 is perpendicular to the longitudinal axis of the rear axle 3. When the axis S of the damper 9 is perpendicular to the longitudinal axis of the horizontal rear axle 3, the torsion force and bending force applied to the damper 9 is minimized. When the rear axle 3 is pivoted from the horizontal state, the axis S of the damper 9 does not incline much with respect to a vertical line perpendicular to the longitudinal axis of the rear axle 3, thus minimizing the torsion and bending forces applied to the damper 9.

A moment is applied to the side plate 23 by the force applied to the back plate 25 and the attachment plate 27. However, since the distance D from the side plate 23 to the pin 30 (holes 25a, 27a), which determines the magnitude of the moment, is within ten centimeters, or relatively small, the moment applied to the side plate 23 is relatively small. Accordingly, when the upper end of the damper 9 is located directly above the rear axle 3, the frame 4 receives force from the damper 9 without problems.

As described above, the back plate 25 and the attachment plate 27 are located in the range A between the end surfaces of the support members 22, and the axis S of the damper 9 remains within a plane parallel to the pivoting plane of the rear axle 3. Therefore, the torsion and bending forces applied to the damper 9 are minimized. As a result, there is no need to use a large strengthened damper 9. Also; there is no need to use an expensive joint, such as a ball joint, for coupling the damper 9, thus simplifying the structure of the coupling. Further, since the back plate 25 and the attachment plate 27 are located in the range A, the length of the pin 30 is minimized, which makes it difficult to strain the pin 30.

When the rear axle 3 is horizontal, the axis S of the damper 9 is perpendicular to the longitudinal axis of the rear axle 3. This reduces the torsion and bending forces applied to the damper 9.

The back plate 25, which constitutes the frame 4, is used for attaching the cylinder tube 10. This reduces the number of parts for the attachment and simplifies the structure of the frame 4.

The damper 9 is supported at the end of the rear axle 3. This relatively reduces the load applied to the damper 9, which enables the damper 9 to be compact.

The present invention can further be embodied as follows.

Figure 9:
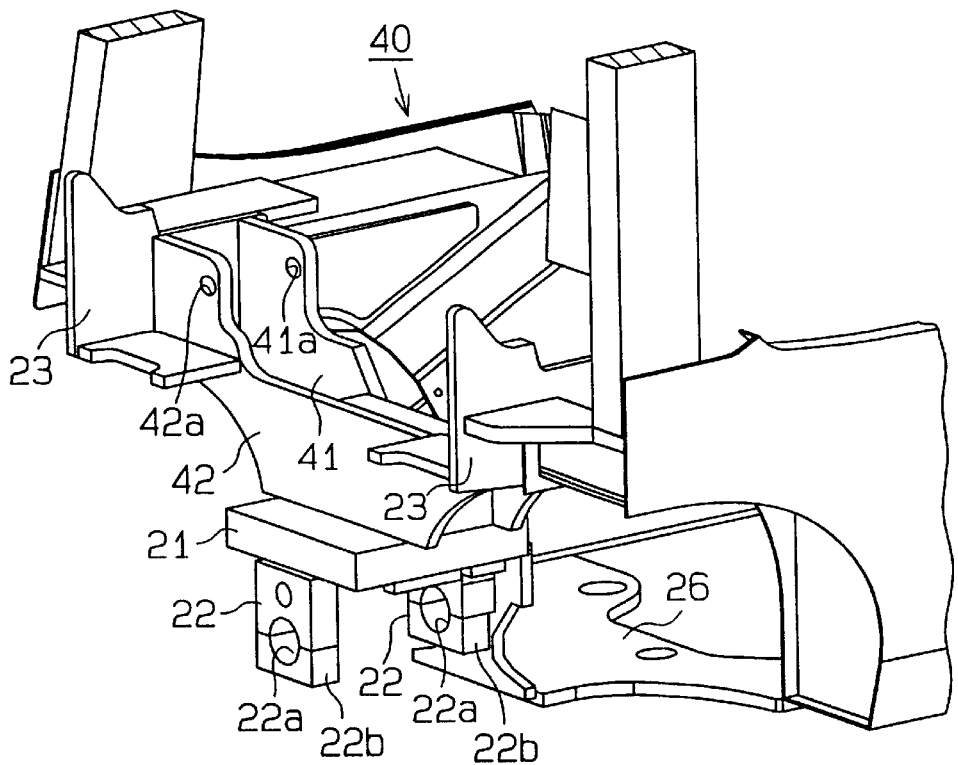
FIG. 9 is a partial perspective view of a vehicle frame according to a second embodiment.
Figure 10:
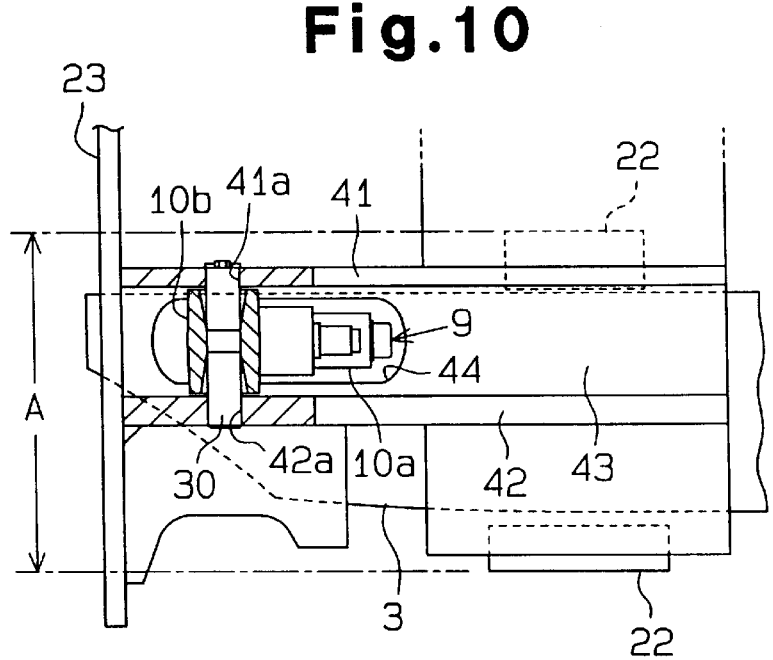
FIG. 10 is a partial plan view of the vehicle frame of FIG. 9.
Figure 11:
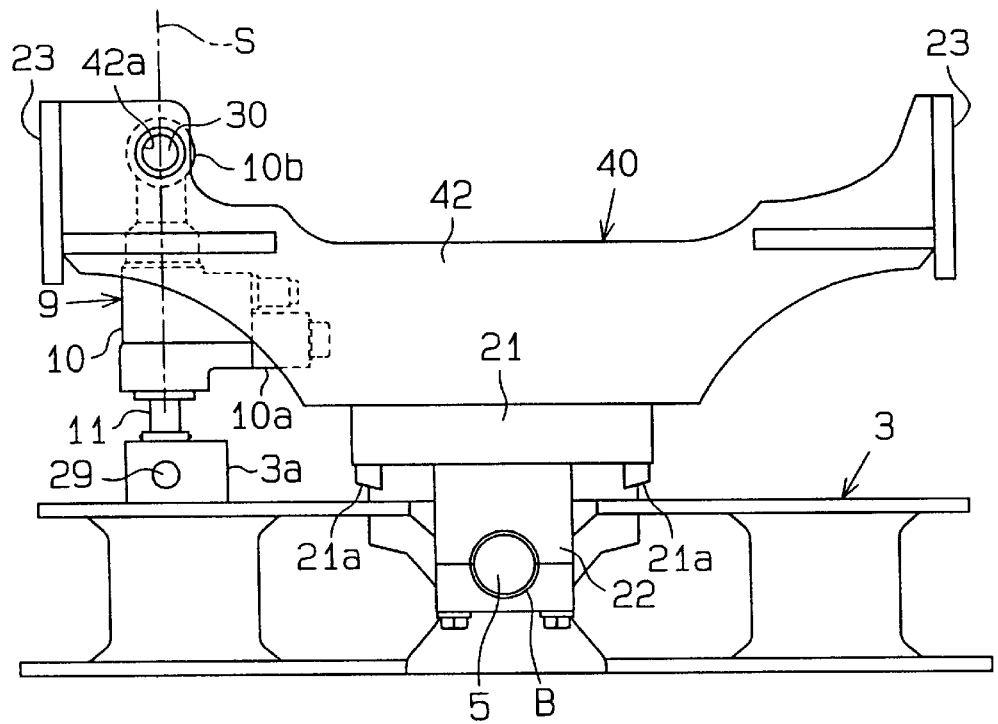
FIG. 11 is a partial rear view of the vehicle frame and the rear axle of FIG. 9.

FIGS. 9–11 show a frame 40 according to a second embodiment. In the second embodiment, two back plates 41, 42, which connect the side plates 23, are located above the rear axle 3. In this case, the upper end of the damper 9 is supported by the back plates 41, 42 without the attachment plate 27. A bottom plate 43 is located between the bottoms of the back plates 41, 42. Aligned holes 41a, 42a are formed in corresponding ends of the back plates 41, 42. The upper end of the damper 9 is supported between the back plates 41, 42 by inserting the pin 30 in the holes 41a, 42a. In one end of the bottom plate 43, an opening 44 is formed to permit passage of the damper 9. The size of the opening 44 is set to avoid interference with the damper 9. The frame 40 of FIG. 9 is more strengthened than the prior art for receiving the force of the damper 9.

As in the embodiment of FIG. 1, the back plates 41, 42 are located in the range A between the outer end surfaces of the support members 22. The damper 9 is located within a vertical projection of the rear axle 3, and the axis S of the damper 9 remains in a plane perpendicular to the pivoting axis of the rear axle 3. As shown in FIG. 11, when the rear axle 3 is horizontal, the axis S of the damper 9 is perpendicular to the longitudinal axis of the rear axle 3. This embodiments provides the same advantages as the first embodiment of FIGS. 1–8.

Figure 12:
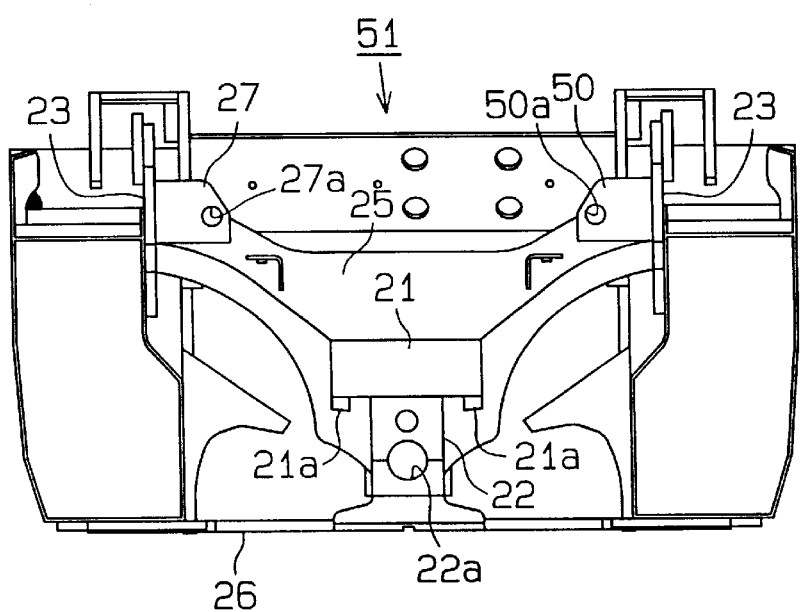
FIG. 12 is a rear view of a vehicle frame according to a third embodiment.

Instead of one damper 9, two dampers 9 may be attached by two pins 30 to the ends of the rear axle 3, respectively. That is, as shown in FIG. 12, a pair of attachment plates 27, 50 are symmetrically formed on a frame 51 so that the upper ends of the two dampers are supported. A hole 50a, like the hole 27a, for receiving one of the pins 30 is formed in the attachment plate 50. A similar hole also formed in the corresponding part of the back plate 25 in alignment with the hole 50a.

The damper is not limited to a type for locking the rear axle 3. A damper without a lock mechanism may be used.

The axis S of the damper 9 may be slightly inclined with respect to a plane perpendicular to the pivoting axis of the rear axle 3.

The axis S of the damper 9 does not necessarily have to be perpendicular to the longitudinal axis of the horizontal rear axle 3.

The place where the damper 9 is attached to the frame 4 may be formed by only making a hole in the frame members for receiving a crevice (pin) of crevice type cylinder. Also, the cylinder tube 10 may be attached to the frame by using bolts or rivets. The frame may support the upper end of the damper at one point instead of two. The hole for receiving the pin 30 may be formed only in the back plate 25.

The damper 9 may be reversed from the orientation shown in FIG. 1. That is, the cylinder tube 10 may be attached to the rear axle 3 and the piston rod 11 may be attached to the frame 4. This structure has the same advantages as the embodiment of FIG. 1.

The wheels supported by the axle are not limited to steered wheels. The axle may support wheels that are not steerable.

The damper 9 is not limited to a double-acting type hydraulic cylinder, and it may be a single acting type. Cylinders using operating fluids other than oil, such as air, may also be used.

The present invention is not limited to the forklift 1 and may be employed to various industrial vehicles having a rear axle that pivots about a center pin.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An industrial vehicle including:
    a frame, the frame having a forward end and a rearward end;
    an axle pivotally jointed to the frame about a center pivot axis, the axle having a first end and a second end;
    a front supporting member and a rear supporting member that support the frame on the axle, wherein the axle is located between the front support member and rear support member, and wherein the center pivot axis is included in a plane that intersects the support members;
    a damper located between the frame and the axle, the damper having a longitudinal axis, an upper end of the damper being connected to the frame and a lower end of the damper being connected to the axle; and
    a bracket located on the frame, wherein the bracket receives the upper end of the damper, and wherein the bracket is located no further forward than the front support member and no further rearward than the rear support member.

2. The industrial vehicle according to claim 1, wherein the position of the bracket is determined so that the longitudinal axis of the damper is always located in a plane perpendicular to the center pivot axis.

3. The industrial vehicle according to claim 1, wherein the frame includes a pair of side plates and at least one back plate to which the side plates connect, wherein bracket includes a part of the back plate.

4. The industrial vehicle according to claim 3, wherein the upper end of the damper is relatively close to one of the side plates.

5. The industrial vehicle according to claim 4, wherein a distance between the upper end of the damper and the side plate is within ten centimeters.

6. The industrial vehicle according to claim 1, wherein, when the axle is in a horizontal, unpivoted state and the vehicle is on a horizontal surface, the longitudinal axis of the damper is substantially perpendicular to the axle.

7. The industrial vehicle according to claim 1, wherein the bracket is an upper bracket, and the upper end of the damper is pivotally connected to the upper bracket about an upper damper pivot axis, which is parallel to the center pivot axis, and a lower bracket is located on t he axle, the lower end of the damper being connected to the lower bracket about a lower damper pivot axis, which is parallel to the center pivot axis.

8. The industrial vehicle according to claim 1, wherein a pair of steerable wheels are pivotally supported about steering axes at the ends of the axle.

9. The industrial vehicle according to claim 8, wherein the bracket is an upper bracket, and a lower bracket is located on the axle, the lower end of the damper being connected to the lower bracket, wherein the lower bracket is located within a vertical projection of the axle.

10. The industrial vehicle according to claim 9, wherein the lower bracket is located as close as possible to a plane in which the steering axes lie.

11. An industrial vehicle including:
    a frame, the frame having a forward end and a rearward end;
    an axle pivotally jointed to the frame about a center pivot axis, the axle having a first end and a second end;
    a front supporting member and a rear supporting member that support the frame on the axle, wherein the axle is located between the front support member and the rear support member, and wherein the center pivot axis is included in a plane that intersects the support members;
    a pair of steerable wheels, each supported pivotally about a steering axis at each end of the axle;
    a damper located between the frame and the axle, the damper having a longitudinal axis, an upper end of the damper being connected to the frame and a lower end of the damper being connected to the axle;
    an upper bracket located on the frame, the upper end of the damper being connected to the upper bracket, wherein the upper bracket is located no further forward than the front support member and no further rearward than the rear support member; and
    a lower bracket located on the axle, the lower end of the damper being connected to the lower bracket, wherein the lower bracket is located within a vertical projection of the axle.

12. The industrial vehicle according to claim 11, wherein the position of the lower bracket is located such that the longitudinal axis of the damper and the steering axis are both included on or nearby included in a single plane.

13. The industrial vehicle according to claim 11, wherein the upper and lower brackets are located at positions on the frame and the axle so that the longitudinal axis of the damper is always located in a plane perpendicular to the center pivot axis.

14. The industrial vehicle according to claim 13, wherein the upper end of the damper is pivotally connected to the upper bracket about an axis parallel to the center pivot axis, and wherein the lower end of the damper is connected to the lower bracket about an axis parallel to the center pivot axis.

15. The industrial vehicle according to claim 11, wherein the frame includes a pair of side plates and at least one back plate to which the side plates connect, wherein bracket includes a part of the back plate.

16. The industrial vehicle according to claim 15, wherein the upper end of the damper is relatively close to one of the side plate.

17. The industrial vehicle according to claim 16, wherein a distance between the upper end of the damper and the side plate is within ten centimeters.

18. The industrial vehicle according to claim 11, wherein, when the axle is in a horizontal, unpivoted state and the vehicle is on a horizontal surface, the longitudinal axis of the damper is substantially perpendicular to the axle.

19. An industrial vehicle including:
    a frame having a forward end and a rearward end;

a front support member and a rear support member, each of which is attached to the frame;

an axle pivotally supported between the front and rear support members so that the axle supports the frame through the front and rear support members;

whereby movement of the axle is limited to a pivotal movement about a center axis of the axle; and a damper located between the frame and the axle, the damper having a longitudinal axis, an upper end connected to the frame and a lower end connected to the axle, wherein the upper and lower ends are positioned no further forward than the front support member and no further rearward than the rear support member.

20. The industrial vehicle according to claim 19, wherein an upper surface of the axle is coupled to a lower end of the damper.

21. The industrial vehicle according to claim 19, wherein the front and rear support members are rigidly attached to the frame.

* * * * *

UNITED STATES PATENT AND TRADEMARK OFFICE
CERTIFICATE OF CORRECTION

PATENT NO.    : 6,398,242 B1  
DATED         : June 4, 2002  
INVENTOR(S)   : Yasuhiro Niwa et al.

It is certified that error appears in the above-identified patent and that said Letters Patent is hereby corrected as shown below:

<u>Column 7,</u>  
Line 64, change "located on t he axle, the" to -- located on the axle, the --.

Signed and Sealed this

Twenty-ninth Day of October, 2002

*Attest:*

JAMES E. ROGAN  
*Attesting Officer*  *Director of the United States Patent and Trademark Office*